United States Patent [19]

Kunjumon

[11] 4,289,292
[45] Sep. 15, 1981

[54] VARIABLY SUPPORTED CONTAINER

[76] Inventor: Varughese Kunjumon, 3706 N. Greenwood, Victoria, Tex. 77901

[21] Appl. No.: 48,972

[22] Filed: Jun. 15, 1979

[51] Int. Cl.³ ........................................ F16M 11/00
[52] U.S. Cl. ................................ 248/333; 248/334.1; 248/407; 248/561; 211/117; 312/247
[58] Field of Search .................... 248/333, 334.1, 335, 248/330.1, 326, 162.1, 407, 408, 409, 561; 211/117; 108/149; 312/247

[56] References Cited

U.S. PATENT DOCUMENTS

| 258,104 | 5/1882 | Newton | 248/335 |
|---|---|---|---|
| 530,469 | 12/1894 | Boyd | 248/408 |
| 713,114 | 11/1902 | La-Force | 248/408 |
| 955,349 | 4/1910 | O'Brien | 248/407 |
| 1,110,049 | 9/1914 | Goldberg | 248/333 |
| 1,343,279 | 6/1920 | Reynolds | 248/408 |
| 1,453,650 | 5/1923 | Willson | 248/408 |
| 2,195,162 | 3/1940 | Baxter | 248/333 |
| 2,382,354 | 8/1945 | Wales | 312/247 |
| 2,605,987 | 8/1952 | Brown et al. | 248/408 |
| 3,469,870 | 9/1969 | Barkus | 248/407 |

Primary Examiner—Victor N. Sakran
Attorney, Agent, or Firm—Bard, Groves, Sroufe, Ryerson & Jackson

[57] ABSTRACT

A container for suspending various small articles such as toiletries, poisons, spices, and plants from an overhead support at a plurality of elevations is provided. A releasably locking member for one-handed height adjustment of the container is further provided, as well as automatic retracting means for returning the container to a convenient storage position.

10 Claims, 11 Drawing Figures

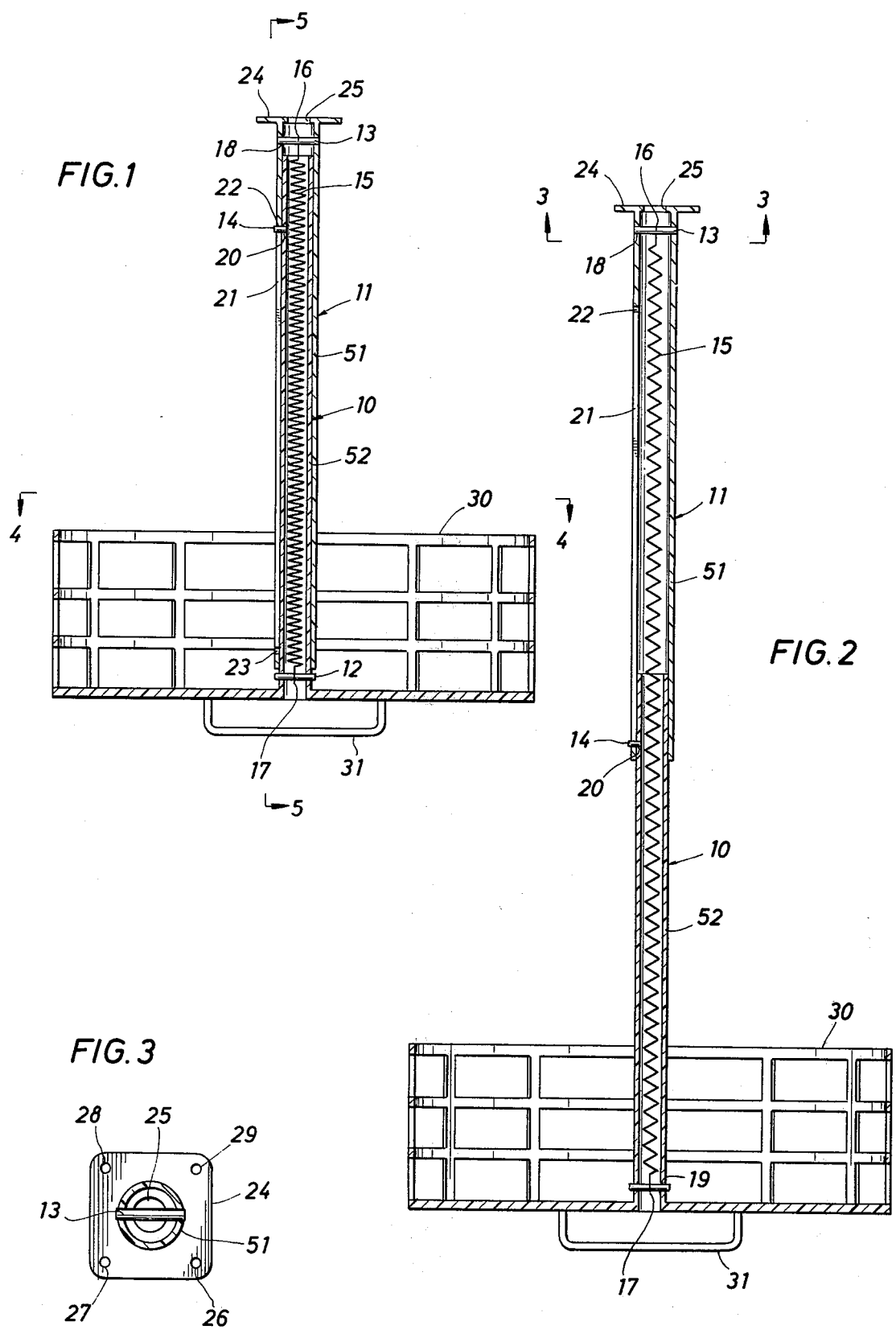

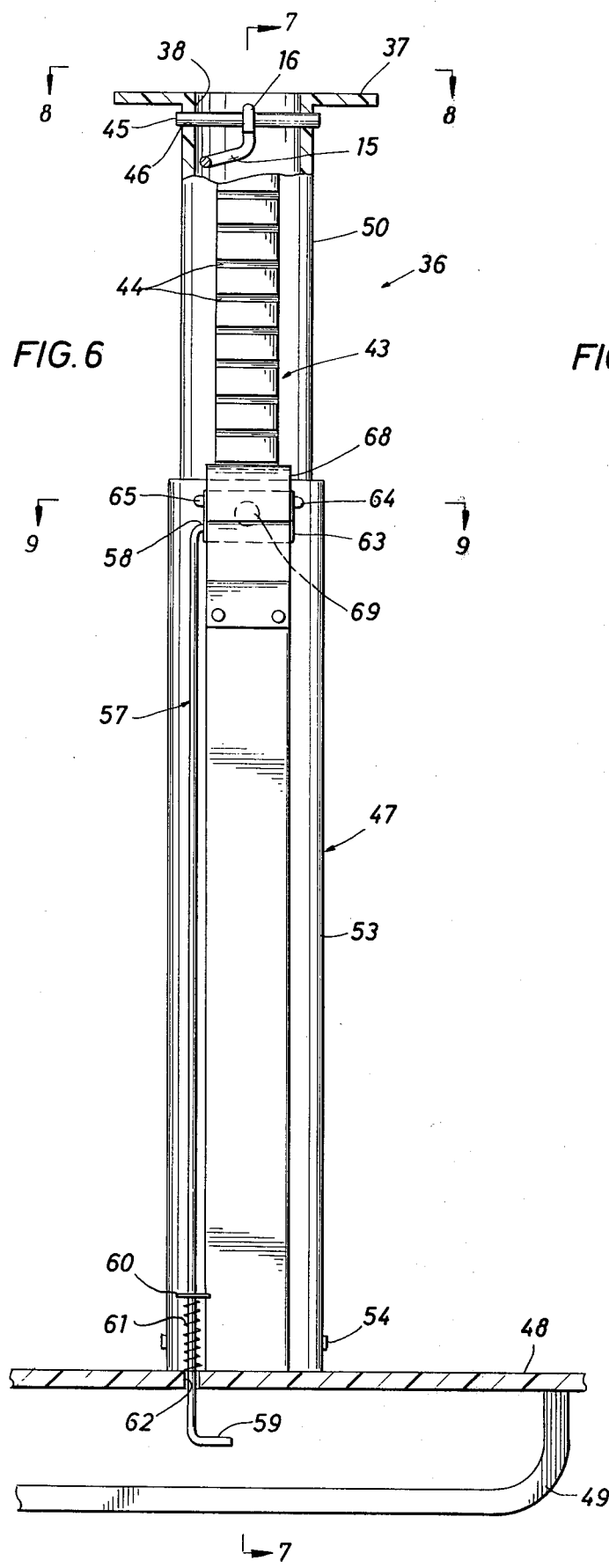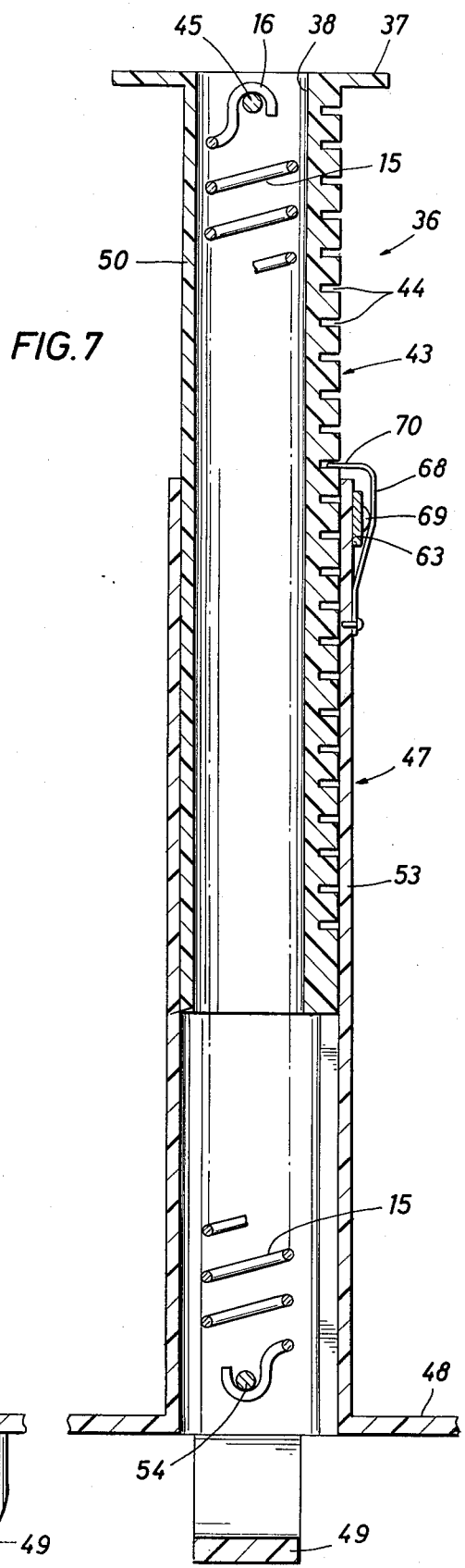

VARIABLY SUPPORTED CONTAINER

BACKGROUND OF THE INVENTION

This invention relates to methods and apparatus for supporting articles, and more particularly relates to improved methods and apparatus for supporting articles at adjustable heights.

It is well known to provide for tables and platform structures suspended from above which are adjustable in height, thus providing means for supporting articles at various elevations and for convenient storage of the structures when not in use. However, such devices are generally cumbersome, expensive and not well suited to the storage of small articles. Moreover, because of their size and weight, the mechanisms involved in such devices are frequently quite complicated.

For example, one such apparatus comprises a plurality of telescoping tubular sections suspended from the ceiling, each of which is internally and externally threaded so as to be threadedly received by the next largest section. The smallest section is attached to a table or platform. By rotating the table by means of a large electric motor, the table is made to screw upward to any desired height as the sections telescope into one another. This attempt to provide a convenient, simple method and apparatus for support of articles has obviously serious disadvantages in applications where a simple easy to operate, expensive and portable means is desired for containing small articles at various heights.

Yet another attempt to provide for such containers intended for smaller articles involves the suspension of a vanity case or the like from the ceiling of an automobile by means of a pair of scissor-like "lazy-tongs" which fold up when the case is stored in the ceiling. This device is also subject to certain disadvantages common to such containers, of such a magnitude as to severely limit or destroy their practical value. First, there is no provision for selective one-handed height adjustment of the container. More serious, however, is the inability of the apparatus to self-retract when it is no longer needed.

The present invention relates to an improvement over all such prior attempts to provide a practical variable support container. It will be seen that it would be highly desirable to provide a container for small articles which was easy and inexpensive to assemble, with a minimum of parts, and yet could be easily and reliably positioned and locked at any of numerous desired vertical locations with one hand. For example, in the case of supports for potted plants, it would be desirable to conveniently position the plants at a number of varying heights for watering or for varying sunlight conditions. Moreover, it would be desirable to provide a novel technique for accomplishing the positioning, for retrieval of cooking spices stored in the container, for example, wherein one hand remains free at all times to perform cooking operations. Furthermore, it would also be highly desirable to provide for a maximum extension and retraction of the container as well as capability for automatic retraction of the container after use.

It will be readily apparent from a consideration of the teachings hereinafter provided, that the disadvantages of other known variable support containers are overcome with the present invention, and a simplified and commercially acceptable variable support container means is herein provided with capabilities exceeding that of present supported containers.

SUMMARY OF THE INVENTION

This invention is for an improved container assembly for suspending small articles. It includes a container suspended from a suitable overhead support, such as a ceiling, by an elastic member, preferably a coil spring or the like. The container assembly further comprises a pair of telescoping guides which may be tubular in shape, and are in coaxial relation about the supporting spring. More particularly, a first such guide is preferably attached at one end thereof to the container and extends in a generally upward direction. The second or outer guide is provided with a suitable flange for mounting the guide on the overhead support, and extends downward enclosing the first or inner guide and spring. One end of the spring is attached to the outer guide at a point proximal to the flange, and the other end is attached to the inner guide at a point proximal to the container member.

In one particularly ideal embodiment of the present invention, a vertical slot is provided in the outer guide having a short transverse notch at either end thereof. A guide pin extends radially outward the inner guide, and is received by the slot. As the container is pulled downward, the inner guide is slidably extracted from the outer guide as the guide pin traverses the slot and the spring is expanded. When the guide pin has reached the end of the slot, by rotating the container member slightly, the guide pin will engage the lowermost transverse notch of the slot. The container will thus be extended in a fully downward and locked position, for access to the contents thereof, whereby the spring, which is now under tension, is prevented from returning the container to its unextended position due to the guide pin which releasably engages the notch. By rotating the container in the opposite direction, the process will be reversed, whereby the container is retracted or elevated to its unextended position by the spring and into a convenient storage position, where it may again be locked by engaging the guide pin and the uppermost notch.

In one ideal embodiment of the invention, the outer guide and flange are of an integral construction, not only obviating need for additional parts and assembly thereof to co-join them, but permitting the inner guide to be slidably received almost entirely within the outer guide. Moreover, because of this factor and the fact that the inner guide preferably surrounds the spring rather than extending within it, the guide pin may be affixed to the first guide at a higher point, and need not extend through the spring to reach the guide slot. In this manner, maximum extension of the container is provided for, as well as a retraction spring which may extend the full length of the inner and outer guides when in the retracted position if desired.

In addition to the various problems of the devices of the prior art hereinbefore noted, such as their limited extension capability, it has been discovered that in certain applications it is highly undesirable to require rotation of the container to achieve a locking condition. For example, excess rotation has been found to weaken the connection between the flange and the support. Moreover, it is also frequently disadvantageous to only be capable of locating the container in one of two discreet locations, rather than through a continuous range of elevations. For example, in the case of hanging potted plants, it may be desirable to selectively adjust the elevation of the container in response to varying lighting conditions. As will hereinafter be explained in greater detail, in an alternative embodiment of the present invention, an improved, reliable, yet simple technique has been discovered for locking a telescoping variable support container in a plurality of elevations.

It is a feature of the present invention to provide an improved self-retracting overhead supported container which may be locked in at least two vertical positions.

l It is another feature of the present invention to substantially improve the length to which retracting variably supported containers may be extended.

It is a further feature of the present invention to provide a novel technique for locking a self-retracting container for small articles in at least two vertical positions.

These and other features and advantages of the present invention will become apparent from the following detailed description, wherein reference is made to the figures in the accompanying drawings.

IN THE DRAWINGS

FIG. 1 is a cross-sectional view of the variable support container apparatus in an unextended position.

FIG. 2 is a cross-sectional view of the variable support container apparatus in a fully extended position.

FIG. 3 is a cross-sectional view of a portion of the variable support container apparatus of FIG. 2 taken along the line 3—3 thereof.

FIG. 6 is a side view, partly in cross-section, of another embodiment of the variable support container apparatus in a partially extended position.

FIG. 7 is a cross-sectional side view of the variable support container apparatus of FIG. 6 in a partially extended position taken along the line 7—7 thereof.

DETAILED DESCRIPTION

Figure 4:
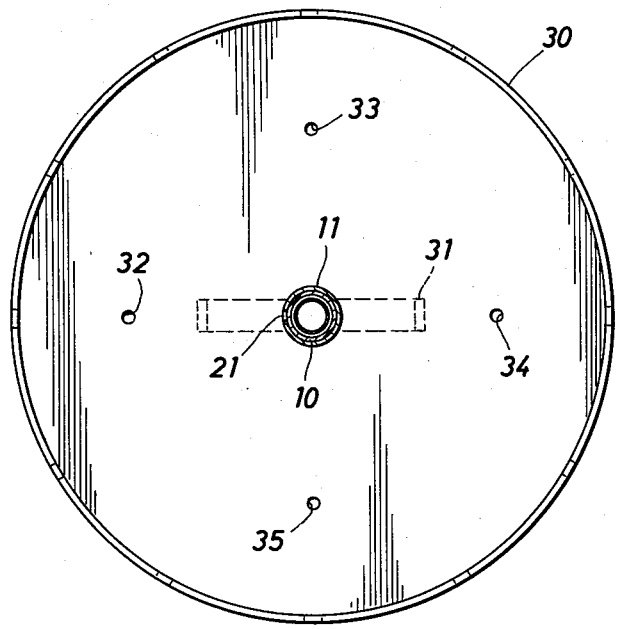
FIG. 4 is a top view of the variable support container apparatus of FIG. 1 taken along the line 4—4 thereof.

Referring now to FIGS. 1 and 2, one embodiment of a variably supportable container is shown, which is of a type preferred for the storage of small articles such as toiletries, poisons, spices, plants, or the like, wherein it is desirable to position the container at more than one elevation. Accordingly, the apparatus may comprise a container assembly, generally designated by the numeral 10, having a container member 30, such as a basket, mounted at one end thereof, which is adapted to hold the particular articles of interest. The container member 30 depicted in FIGS. 1 and 2 may further be seen to include a handle 31, permitting a user to adjust the elevation of the container member 30 in a manner to be described in more detail hereinafter with reference to FIG. 5. The container assembly 10 is further comprised of a vertical guide extension 52 affixed at the lower end thereof to the bottom of the container member 30. Referring to FIG. 4 it will be noted that the bottom of the container member 30 is provided with an appropriate number of drainage ports 32-35 for permitting effluent to drain from potted plants or the like in a typical application of the container of the present invention. Disposed in coaxial relation to the vertical guide extension 52 portion of assembly 10 there may be seen a support member 11 having a correlative vertical guide extension 51 portion which slidably receives vertical guide extension 52. The support member 11 may conveniently be fixedly attached to an appropriate support such as a ceiling or the like so as to hang downward by means of screws (not shown) inserted through screw holes 26-29 which extend through a flange 24 integrally connected to support member 11.

Figure 5:
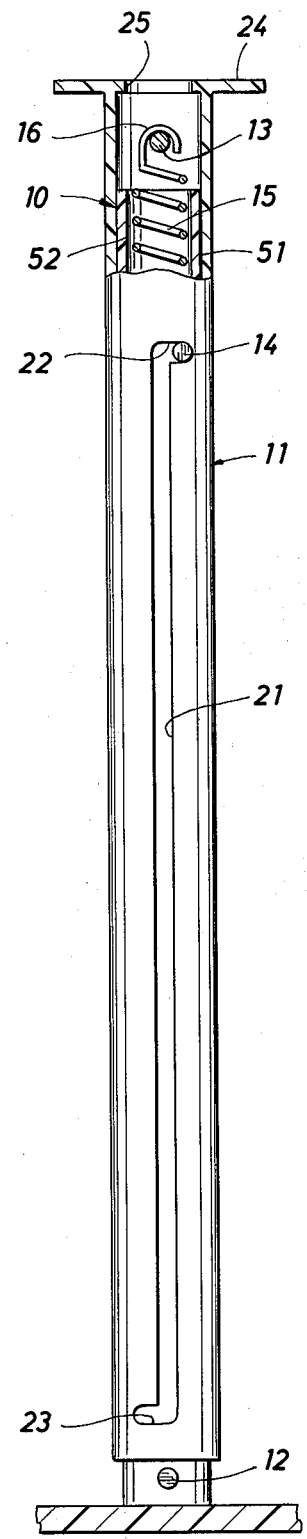
FIG. 5 is a side view, partly in cross-section, of a portion of the variable support container apparatus of FIG. 1 taken along the line 5—5 thereof.
Figure 8:
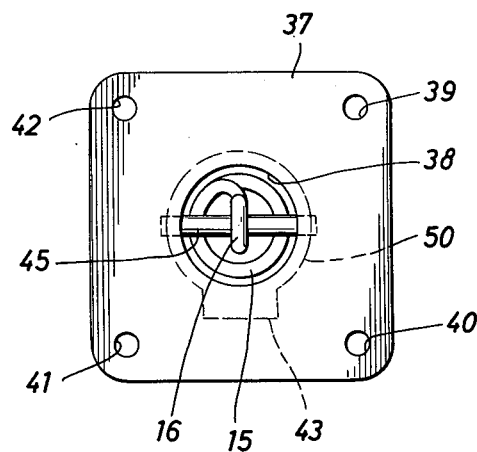
FIG. 8 is a top view of the variable support container apparatus of FIG. 6 taken along the line 8—8 thereof.
Figure 9:
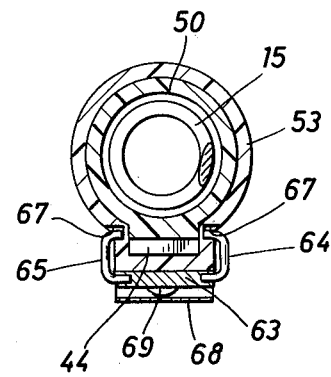
FIG. 9 is a top cross-sectional view of the variable support container apparatus of FIG. 6, taken along the line 9—9 thereof.
Figure 10:
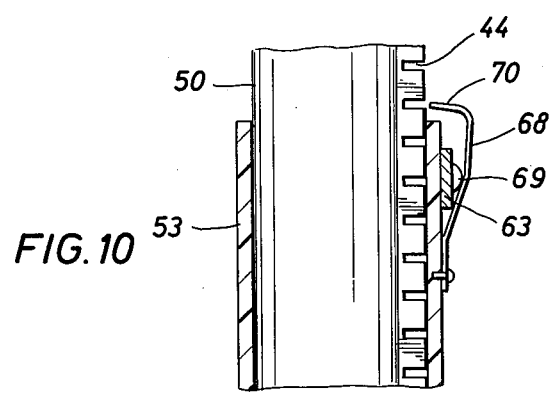
FIG. 10 is a cross-sectional side view of a portion of the variable support container apparatus of FIG. 7 in an unlocked mode.
Figure 11:
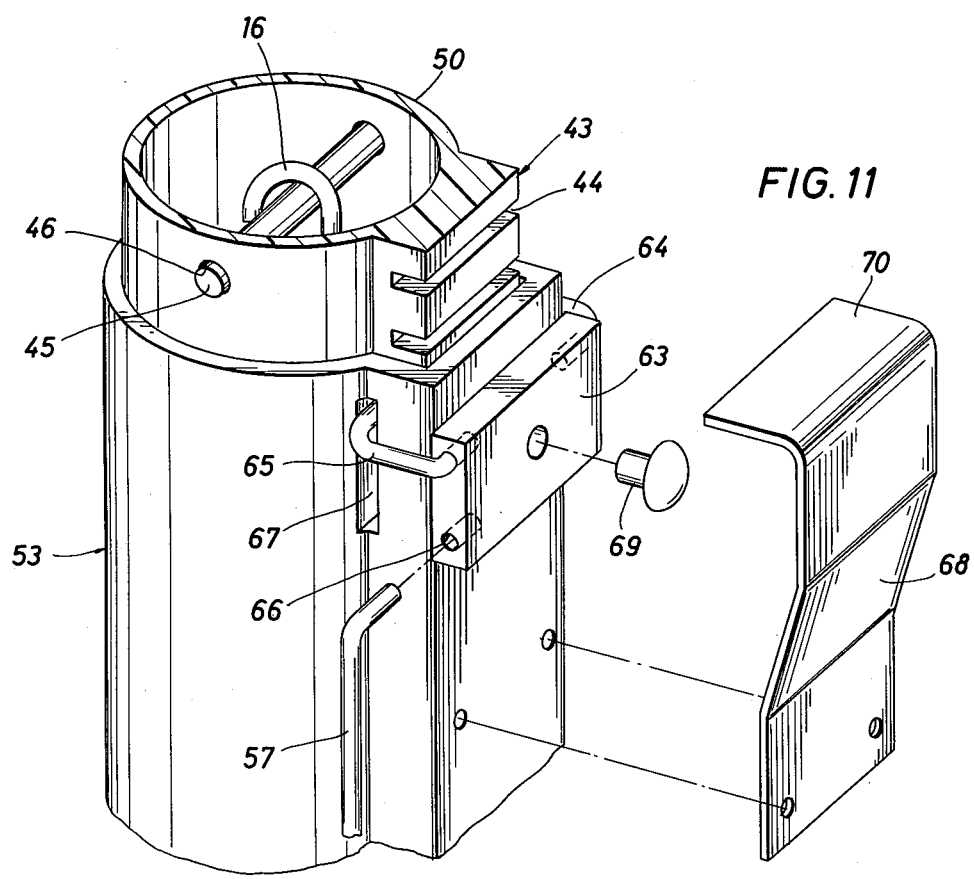
FIG. 11 is a pictorial view of a portion of the variable support container apparatus of FIG. 6.

Still referring to FIGS. 1 and 2, there will further be seen a pin hole 18 extending transversely through support member 11 at a point proximal to the flange 24 and carrying a transverse pin 13. Placement of this pin 13 may be more clearly seen from the cross-sectional view of support member 11 depicted in FIG. 3 and taken along line 3—3 of FIG. 2. In like manner, a pin hole 19, extending through container assembly 10 at a point distal to flange 24 may be seen carrying a similar transverse pin 12. Pendantly disposed from pin 13 by means of a hook 16, as shown in FIG. 5, extending within assembly 10 and support member 11 in coaxial relation thereto, is an elastic retracting means 15, such as an expanding coil spring. A similar hook 17 at the opposite end of the retracting means 15 engages transverse pin 12. The flange 24 may be provided with a flange aperture 25, if desired, for permitting insertion of the retracting means 15 within vertical guide extension 52 during assembly of the container after extensions 51 and 52 are brought in coaxial relation. It will thus be seen from a comparison of FIGS. 1 and 2, that by fixedly attaching the flange 24 to an appropriate support and by exerting a force in a generally downward direction by means of handle 31, the assembly 10 is thereby made to travel in a generally downward direction as the extension 51 slidingly telescopes from extension 52 to the fully extended position depicted in FIG. 2.

As hereinbefore noted, it is conventional to provide for hollow telescoping support members utilized for various purposes, wherein there is disposed means such as a spring for retracting the extended members when desired. What has not heretofore been recognized, however, is that locking mechanisms provided in the present invention will offer significant advantages when used in combination with other features thereof to be hereinafter noted.

Referring now to FIGS. 1 and 2 again, there may be seen depicted therein one embodiment of such a locking mechanism. More particularly, in FIG. 1 it will be noted that a guide pin 14 has been provided which is retained by a pressure fit or other suitable means within a guide hole 20 disposed within the wall of the vertical guide extension 52 and extending radially outward from the extension 52. Referring to FIG. 5 now, the guide pin 14 may be seen projecting into a slot extension 22 of a suitable bayonet slot 21. Slot 21 preferably extends entirely through the wall of the vertical guide extension 51 and in a generally vertical direction for substantially the whole length of the vertical guide extension 51. At the end of bayonet slot 21, opposite to that of slot extension 22, a similar slot extension 23 is provided. As seen in FIG. 5, the diameter of the guide pin 14 is selected so as to allow it to easily traverse the entire length of the bayonet slot 21 and enter the extensions 22 and 23.

Referring once again to FIGS. 1 and 2, it will now be apparent the manner in which the embodiment of the invention depicted therein accomplishes the feature of extending the container member 30 from a stored or elevated position depicted in FIG. 1 to a fully extended and locked position depicted in FIG. 2. The user simply rotates the container member 30 by means of handle 31, causing guide pin 14 to move to the left and to disengage from the slot extension 22. The handle 31 is thereafter pulled in a generally downward direction, causing the vertical guide extension 52 to be extracted from within the correlative vertical guide extension 51. Simultaneously, the retracting means 15 is being extended, creating a restoring force which seeks to return the container assembly 10 to the initial position shown in FIG. 1 as the guide pin 14 traverses the bayonet slot 21 within the wall of vertical guide extension 51. When the vertical extension guide 52 is sufficiently extracted, it will be appreciated that the guide pin 14 will abuttingly engage the lowermost end of the bayonet slot 21 as depicted in FIG. 2. The user then, by continuing to rotate the handle 31, will cause the guide pin 14 to re-engage a slot extension, in this case extension 23. This will accordingly accomplish the locking feature of this invention, whereby the container assembly 10 is locked in a fully extended position and the restoring force of the retracting means 15 is thereby prevented from returning the container assembly 10 to the position of FIG. 1. It should be readily apparent that by reversing the procedure hereinabove set forth, the container assembly 10 may thereby be caused to return to the position of FIG. 1, wherein it is again in a locked configuration.

It should be understood that any of several materials may be employed in the construction of the container assembly 10 and support member 11 of this invention such as plastic. However, both assembly 10 and support member 11 are preferrably of an integral construction such as molded plastic so as to provide a commercially feasible container which may be assembled with six or fewer part. Even the pins 12-14 may be extruded in one assembly with their respective extensions 51-52.

It has been determined, as hereinbefore noted, that it is highly desirable to provide for maximum extension of a container assembly 10, which may be securely locked in either extended or automatically retracted positions. By providing hollow telescoping members of approximately the same length, such as extensions 51 and 52, wherein a guide pin 14, carried at the extremity of one extension thereof may be caused to traverse a bayonet slot 21 which extends almost the full length of the other extension, and wherein the retracting means is disposed within the extensions, this feature is thus achieved. Thus, many of the serious disadvantages of prior devices are obviated, such as the failure to incorporate a locking technique or the construction of vertical guide extensions in such a manner as to interfere with the retracting means 15, including preventing use of such means extending the full length of the extensions 51 and 52.

It will be readily apparent that numerous other embodiments of the present invention are contemplated. For example, extension 51 may be disposed within extension 52, in which case the guide pin 14 will extend inward rather than radially outward. Moreover, the bayonet slot 21 may alternatively be carried by the internal extension 52 of FIG. 5, and the guide pin 14 extending inward from its mounting on external extension 51 to the bottom slot extension 23, now carried by extension 52. Still further, multiple slot extensions, such as extensions 22 and 23 may be provided for bayonet slot 21, so as to permit selective positioning of the container assembly at a plurality of elevations.

Yet another embodiment of the present invention may be seen in FIGS. 6-11. As hereinbefore explained, it is a feature of this invention to provide for multiple locked positions of the supported container. Accordingly, referring now to FIG. 6, there will be seen depicted therein another embodiment of the present invention, featuring a locking mechanism enabling the variable support container to be positioned, securely locked, and thereafter released at a plurality of elevations. As hereinbefore stated, it is frequently desirable to position a small article container at a number of vertical locations, as, for example, in the case of houseplants suspended therein, wherein adjustment for variable lighting conditions is desired.

Accordingly, referring now more particularly to FIG. 6, a container assembly 47 is depicted therein, having a vertical guide extension 53 portion, a container member 48 portion, such as a basket or the like, and a convenient handle 49. Disposed therein is a hollow telescoping support member 36, also having a vertical guide extension 50 portion. At one end of the vertical guide extension, a flange 37 may be seen, having four screw holes 39-42, depicted in FIG. 8, which receive mounting screws (not shown) for fixedly attaching the support member 36 to a convenient mounting place, as previously described, so as to cause the support member 36 to hang in a generally downward direction.

Referring again to FIG. 6, it will be noted that the support member 36 is provided with a guide pin 45, retained by a guide pin hole 46, and a corresponding guide pin 54 has been provided the container assembly 47 at a point proximal to the base of the container member 48. As with the previously depicted embodiment, the purpose of the pins 45 and 54 are to receive and retain their correlative ends of a suitable retraction spring 15, disposed within the vertical extension guide 50, by means of spring hooks 16 at either end of the spring 15. Still referring to FIG. 6, there will be seen the means whereby the container assembly 47 may be positioned at a plurality of elevations. Specifically, it will be noted that the outer surface of the support member 36 is preferably provided with a plurality of retention lips 43, separated by a suitable number of slots 44 for receiving a spring lip 70 portion of a conventional leaf spring 68 in a manner to be described.

Referring now to FIG. 7, it will be noted that, in the embodiment depicted therein, the leaf spring 68 is fixedly attached by appropriate means such as rivets or the like to the vertical guide extension 53 on the outer surface of one end thereof. A lock assembly 63 is further provided which is slidably attached to the vertical guide extension 53 by means such as mounting brackets 64 and 65. It will be seen that one end of each bracket 64 and 65 may be attached to the lock assembly 63, and the other end thereof disposed within appropriate bracket grooves 67. The lock assembly 63 may further be provided with a cap 69, the outer surface of which is preferably rounded and in contact with the leaf spring 68. It will thus be appreciated that as the lock assembly 63 is moved downward from the position depicted in FIG. 7 to that of FIG. 10, as will be described hereinafter in greater detail, the cap 69 will slide along the inner surface of the leaf spring 68, thus causing the spring lip 70 to disengage from the slot 44.

There will further be seen in FIG. 6 a suitable means whereby the lock assembly 63 may be moved in the manner previously described. Specifically, a control arm 57 may be provided, made of a suitable material such as stiff wire, which may be attached to the lock assembly 63 by a pressure fit between the arm hole 66 and the control arm end 57. At the other end of the control arm 57, it will be seen that the arm 57 extends through a control arm aperture 62 carried by the bottom of the container member 48. A suitable control arm handle 59 is further provided at one end of the control arm 57, for purposes to be hereinafter described. There will also be seen in FIG. 6 a spring stop 60, rigidly affixed to the control 57, and an arm spring 61 disposed in coaxial relation with the control arm 57 contacting the spring stop 60 at one end thereof, and the base of the container member 48 at the other end thereof. The manner in which the container member 48 may be selectively positioned may now be appreciated. The user preferably will pull the control arm handle 59 downward while grasping the handle 49. This will, in turn, move the lock assembly 63 downward, causing the cap 69 to slide along the inner surface of the leaf spring 68 forcing the spring lip 70 outward so as to disengage from the slot 44. The user then positions the container member 48 at the desired location. By allowing the retraction spring 15 to retract the container member 48 generally upward, the vertical guide extension 53 thereby telescopes upward around the vertical guide extension 50. Alternatively, by pulling the container member 48 generally downward, the retraction spring 15 is thereby expanded as the vertical guide extension 53 telescopes downward from the extension 50. When the container member 48 is thus positioned at the desired elevation, downward pressure on the control arm handle 59 is thereafter released. The arm spring 61, previously compressed, thus exerts an upward restoring force on the spring stop 60 and accordingly upon the control arm 57. It will be appreciated that this, in turn, will move the lock assembly 63 generally upward, allowing the leaf spring 68 to return to the position depicted in FIG. 7, wherein the spring lip 70 re-engages a slot 44, thereby again locking the container member 48 at the desired elevation.

It will be noted that in the embodiments of the present invention depicted, the flanges have been provided with a flange aperture 25 (FIG. 1) and flange aperture 38 (FIG. 6). It has been found desirable to do so for assembly purposes to be described. In assemblying the present invention, the vertical guide extensions 51 and 52 (50 and 53 in FIG. 6) are first arranged in coaxial relation. The spring 15 is thereafter inserted through the aperture 25 or 38 and the lowermost end thereof secured by insertion of the guide pin 12 (54 in FIG. 6). Alternatively, the insertion and securing of the spring 15 may be performed prior to assembly of the guide extensions. The flange apertures 25 and 38 are thereafter used to grasp the hook 16 so that the spring 15 may be expanded, thus allowing the hook 16 to be positioned above the pin hole 18 (46 in FIG. 6), thereby permitting insertion of the guide pin 13 (45 of FIG. 6). Tension on the spring 15 is thereafter released, allowing the hook 16 to then engage the pins 13 or 45.

It will be apparent from the foregoing that many other variations and modifications may be made in the structures and methods described herein without departing substantially from the essential concept of the present invention. Accordingly, it should be clearly understood that the forms of the invention described herein and depicted in the accompanying drawings are exemplary only and are not intended as limitations in the scope of the present invention.

I claim:

1. Apparatus for suspending articles from a support at a plurality of elevations, comprising
    a first guide member means attachable to said support,
    a second guide member means in slidably coaxial engagement with said first guide member means,
    container means attached to said second guide member means for containing said articles,
    spring means connected between said first and second guide member means for urging said second guide member means toward said support,
    locking means for preventing said slidably coaxial engagement when said first and second guide member means are substantially separated comprising a portion of said first guide member means defining a groove and extension means carried by said second guide member means in matingly slidable engagement with said groove.

2. The apparatus of claim 1, wherein said first and second guide member means are hollow.

3. The apparatus of claim 1, wherein said first and second guide member means are of equal length.

4. The apparatus of claim 3, wherein said spring means is equal in length to said first and second guide member means.

5. The apparatus of claim 4, wherein said spring means is disposed within said first and second guide member means.

6. The apparatus of claim 5, wherein said first guide member means is disposed about said second guide member means.

7. The apparatus of claim 5 or 6, wherein said locking means further comprises
    a first end of said first guide member means proximal to said container means,
    a second end of said first guide member means proximal to said support,
    a portion of said first guide member means defining a "C" slot in said first guide member means, extending from a point adjacent to said first end to a point adjacent to said second end,
    a pin means attached to said second guide member means at a point distal to said container means and extending radially from said second guide member means perpendicular to said coaxial engagement for engaging said slot.

8. Apparatus for suspension of small articles from an overhead support at a plurality of elevations, comprising
    container means for containing said articles,
    first guide means fixedly attachable at one end to said support, having a vertical axis extending from said support,
    second guide means attached to said container means and in slidably coaxial relation to said first guide means for limiting movement of said container means to the direction of said vertical axis,
    spring means connected at one end to said first guide means adjacent to said support and at the other end to said second guide means adjacent to said container means, for urging said container means upward in the direction of said axis, locking means for preventing said axial movement of said container means when said first guide means is disposed in said slidably coaxial relation with said second guide means at a plurality of preselected discrete distances, and means for preventing rotation between said first guide means and said second guide means about said axis comprising a portion of said first and second guide means defining a groove extending in the direction of said axis and an extension matingly and slidably received along said groove.

9. The apparatus of claim 8 wherein said portion of said first and second guide means further comprises a portion of said second guide means defining a rectangular groove on the internal surface thereof extending for the length of said second guide means and a portion of the first guide means defining a rectangular extension disposed on the outer surface of said first guide means extending for the length of said first guide means.

10. The apparatus of claim 8 or 9, wherein said locking means further comprises a leaf spring means fixedly attached at one end to said second guide means and having an end portion, a portion of said first guide means defining a plurality of slots on the outer surface thereof for receiving said end portion, said slots arranged parallel to said axis and separated by said discrete distances, and means for alternatively causing said receiving of said end portion and disengagement of said end portion from any one of said slots.

* * * * *